June 9, 1953      N. L. GOSS      2,641,243
PORTABLE COOKING VESSEL
Filed Nov. 12, 1949
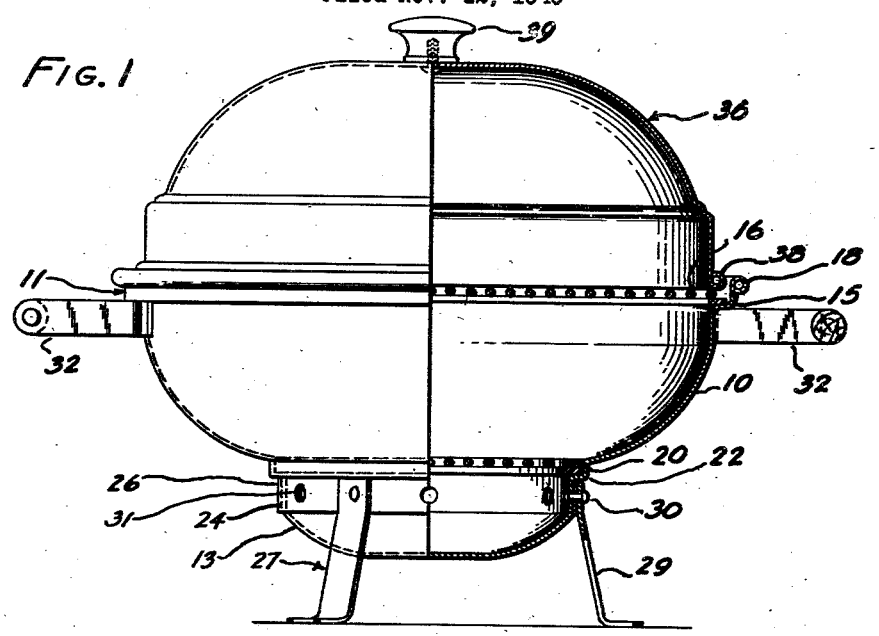
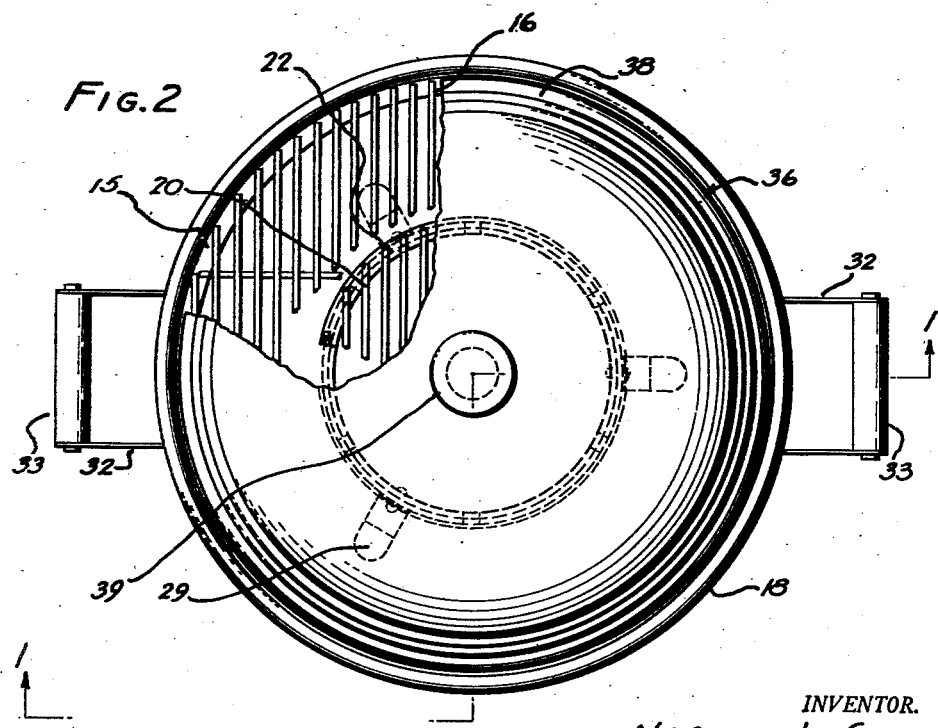
INVENTOR.
NORMAN L. GOSS
BY
ATTORNEY Patented June 9, 1953

2,641,243

UNITED STATES PATENT OFFICE 2,641,243

PORTABLE COOKING VESSEL

Norman L. Goss, Pasadena, Calif.

Application November 12, 1949, Serial No. 126,893

7 Claims. (Cl. 126—25)

This invention relates to improvements in portable cooking vessels, and more particularly to the type adapted for use as a portable barbecue or roaster.

The apparatus of my invention provides a portable cooking vessel, which is equally adaptable for use as a broiler or grill with its cover removed or as a roaster with its cover in position. As an alternative application, food may be prepared elsewhere, say in a large broiler or the like, and then placed in my vessel for transport to the dining site, the apparatus in this instance serving as a heat retainer or warmer.

Portable barbecue apparatus has been proposed heretofore, but most of the proposals involve cumbersome and relatively expensive structures, suitable solely for outdoor use or for restaurants and the like. My invention provides a simple, rugged and inexpensive structure which is easily moved, gives cooking results at least as good as those obtainable with more expensive devices, and which may be used both indoors and outdoors for a variety of purposes, including grilling, roasting, and warming.

Generally the apparatus of my invention comprises a vessel, a first grill or grate mounted across the lower part of the vessel, a second grill disposed across the vessel and spaced above the first grill, and at least one handle affixed to the outside of the vessel. The first grill or grate is used to support a bed of charcoal or other solid combustible beneath the second grill, upon which food is supported. Hereinafter the term "charcoal" is used to signify any solid combustible adapted to use as a broiler fuel.

In my preferred embodiment the vessel is of circular plan and an annular shoulder is formed on the inner wall of the vessel immediately below a beaded upper edge. The second grill rests on the shoulder and supports a concave cover.

A beaded edge of the concave cover is spaced inwardly from the beaded edge of the vessel, leaving an annular space for the escape of fumes from the charcoal bed. The charcoal bed is supported on the first grill or grate resting on a lower annular shoulder formed, like the upper shoulder, in the wall of the vessel. The lower compartment, defined by the bottom of the vessel and the first grill, serves as an ash pit. A plurality of vents are provided in the wall of the lower compartment to permit ingress of air to support combustion. The two grills define a combustion chamber. In my preferred embodiment, the vessel is provided with a pair of opposed handles and a tripod mount.

The apparatus of my invention is readily and easily cleaned upon the removal of the two grills. Preferably, the grills are constructed of steel and the vessel of aluminum to give a lightweight apparatus, easily transported. The heat-resistant steel is the only metal which comes into direct contact with the charcoal. The aluminum, which is less resistant to heat, is however, a good conductor and adequately dissipates excess heat.

Important features of my invention, particularly from the standpoint of manufacture, are the integral construction of the side walls of the two compartments or chambers and the formation of the shoulders in the walls of the vessel. This simplifies manufacture and reduces costs. The formation of shoulders in the walls, rather than the use of hangers, to carry the two grills, facilitates cleaning of the vessel, is less expensive, and more durable.

The design of the apparatus of my invention results in a more efficient cooking vessel. The lower grill is purposely made smaller in size than the upper grill. The amount of charcoal required to cover the lower steel grill will as efficiently and quickly cook food as a larger amount of charcoal upon a larger lower grill with the same size upper grill. This results in considerable fuel saving.

The design of my apparatus permits easy and quick ignition of the charcoal bed. A small amount of inflammable liquid, preferably wood alcohol, is either poured over the charcoal bed or placed directly in the lower compartment. The liquid fuel is then ignited by a lighted match inserted through one of the vents in the wall of the lower compartment. This manner of igniting the charcoal bed reduces the starting time roughly 75%; in approximately ten minutes, after lighting the wood alcohol, the heat from the charcoal bed will cook food.

The invention will be clearly understood from the following detailed description taken in relation to the accompanying drawing in which:

Fig. 1 is a side elevation, partly in section along line 1—1 of Fig. 2, of a preferred form of the apparatus of my invention;

Fig. 2 is a plan view of the apparatus of Fig. 1 with the top cover and the grills partially cut away;

In Fig. 1, a bowl shaped charcoal combustion compartment 10, circular in plan, of a portable cooking vessel 11 is built integrally with and above an ash pit or compartment 13, also bowl-shaped and circular in plan.

An annular shoulder 15, formed in the upper wall of the combustion compartment carries a circular steel grill 16. Meat or other food placed on the grill is exposed to the radiation of heat from a charcoal bed (not shown) disposed in the combustion compartment. The wall of the charcoal compartment, at its upper edge terminates in a bead 18, outside of and immediately above the shoulder.

The ash compartment is disposed beneath and opens into the larger combustion compartment. At the junction of the compartments, a circular steel grill-like grate 20, supporting the charcoal bed, rests on an annular shoulder 22, formed in the upper wall of the lower compartment. The lower compartment for a short distance, directly beneath the shoulder, is of a constant cross section. This cylindrical portion 24 of the lower compartment is encompassed by a circular band 26 of a mount 27. Six vents or air ports 31 connect the interior of the ash compartment to the atmosphere through its wall and the circular band. The mount is a tripod with legs 29 spaced at equal distances around and fastened by rivets 30 to the band and the wall of the ash compartment. A single rivet effectively holds each leg in position and prevents sidewise movement because the upper end of each leg abuts the under side of the protruding shoulder 22 of the compartment.

Two pairs of brackets 32, supporting wooden handles 33, are welded oppositely to the outer wall of the combustion compartment immediately below the shoulder and the bead.

A domed cover 36, with a beaded lower edge 38 and a central knob 39 at its top, is of such size at its open end that when the cover rests upon the upper grill there is an annular space between the bead of the cover and bead of the upper compartment, as clearly shown in the cut away portion of Fig. 1. This annular space in conjunction with the several vents of the lower compartment permits the creation of a draft for more effective combustion and serves as a vent for smoke and gas from the charcoal bed.

I claim:

1. In a portable cooking vessel, the combination comprising an upper compartment, a lower and smaller compartment disposed beneath and opening into the larger upper compartment, a plurality of vents in the wall of the second compartment opening to the atmosphere, a first grill across the vessel at the junction of the compartments, a second grill in the upper compartment above the first grill, a removable cover resting on the second grill with its lower edge spaced inwardly from the wall of the first compartment to form an annular vent between the cover and the first compartment, and at least one handle for transporting the vessel.

2. In a portable cooking vessel, the combination comprising an upper compartment, a lower and smaller compartment disposed beneath and opening into the larger upper compartment, a plurality of vents in the wall of the second compartment opening to the atmosphere, a first removable grill across the vessel at the junction of the compartments, a second removable grill in the upper compartment above the first grill, a removable cover resting on the second grill with its edge spaced inwardly from the wall of the first compartment to form an annular vent between the cover and the first compartment, at least one handle for transporting the vessel, and a mount for supporting the vessel.

3. In a portable cooking vessel, the combination comprising a vessel, a first shoulder formed in the wall of the vessel and spaced from the bottom thereof, a first removable grill resting on the first shoulder, a plurality of vents in the vessel below the first grill, a second shoulder formed in the wall of the vessel adjacent its top and spaced above the first grill, a second removable grill resting on the second shoulder, a removable cover resting on the second grill with its edge spaced inwardly from the wall of the vessel to form an annular vent between the cover and the first compartment, at least one handle affixed to the outside of the vessel, and a base supporting the vessel.

4. In a portable cooking vessel the combination comprising an upper compartment, a lower and smaller compartment opening into the larger upper compartment and having a plurality of vents open to the atmosphere, a first shoulder in the inner wall of the lower compartment spaced from the bottom thereof, a first grill supported on the first shoulder, a second shoulder in the inner wall of the upper compartment adjacent the top thereof, a second and larger grill disposed on the second shoulder, the walls of the shoulders and the compartments being formed integrally with each other, a removable cover resting on the second grill with its lower edge spaced inwardly from the upper edge of the upper compartment to form an annular vent between the cover and the first compartment, at least one handle affixed to the wall of the vessel, and a base supporting the vessel.

5. In a portable cooking vessel, the combination comprising an upper compartment, a lower compartment opening into the upper compartment, a first shoulder in the wall of the lower compartment spaced from the bottom thereof, a first grill supported on the first shoulder, a second shoulder in the wall of the upper compartment adjacent the top thereof, a second grill disposed on the second shoulder, the walls of the shoulders and the compartments being formed integrally with each other, a removable cover resting on the second grill with its lower edge spaced inwardly from the upper edge of the upper compartment, at least one handle for transporting the vessel, a band circumscribing the outer wall of the compartment immediately below the first shoulder, a plurality of legs affixed to the band and the wall, a plurality of vents opening from the interior of the lower compartment through the wall of the compartment and the band to the atmosphere.

6. In a portable cooking vessel, the combination comprising an upper compartment, a lower and smaller compartment disposed beneath and opening into the larger upper compartment, a plurality of vents in the wall of the second compartment opening to the atmosphere, a first grill disposed across the vessel at the junction of the compartments, a second grill larger than the first grill disposed in the upper compartment above the first grill, and a removable cover resting on the second grill with its lower edge spaced inwardly from the wall of the first compartment to form an annular vent between the cover and the compartment, 7. In a portable cooking vessel, the combination comprising a bowl-shaped upper compartment, a smaller bowl-shaped compartment disposed beneath and opening into the bottom of the larger upper compartment, a plurality of vents in the wall of the lower compartment opening to the atmosphere above the bottom of the lower compartment, a first grill disposed across the vessel at the junction of the compartments, a second grill larger than the first grill disposed in the upper compartment above the first grill, and a removable cover resting on the second grill with its lower edge spaced inwardly from the wall of the first compartment to form an annular vent between the cover and the compartment.

NORMAN L. GOSS.

References Cited in the file of this patent

UNITED STATES PATENTS

| Number | Name | Date |
| --- | --- | --- |
| 27,115 | Dunhlee | Feb. 14, 1860 |
| 98,282 | Madison | Dec. 28, 1869 |
| 282,235 | Stern | July 31, 1883 |
| 422,899 | Adams et al. | Mar. 11, 1890 |
| 943,569 | Scamardi | Dec. 14, 1909 |
| 1,035,863 | Cullen | Aug. 20, 1912 |
| 1,725,521 | Keiner | Aug. 20, 1929 |
| 2,072,036 | Horsman | Feb. 23, 1937 |
| 2,299,995 | Kraemer | Oct. 27, 1942 |
| 2,501,381 | Dobin | Mar. 21, 1950 |
| 2,513,580 | Milligan | July 4, 1950 |
| 2,517,320 | Johnston | Aug. 1, 1950 |

FOREIGN PATENTS

| Number | Country | Date |
| --- | --- | --- |
| 480,758 | France | Sept. 21, 1916 |